United States Patent [19]

Mellors

[11] Patent Number: 4,549,943

[45] Date of Patent: Oct. 29, 1985

[54] SUSPENSION BATH AND PROCESS FOR PRODUCTION OF ELECTROLYTIC MANGANESE DIOXIDE

[75] Inventor: Geoffrey W. Mellors, North Royalton, Ohio

[73] Assignee: Union Carbide Corporation, Danbury, Conn.

[21] Appl. No.: 667,163

[22] Filed: Nov. 1, 1984

[51] Int. Cl.$^4$ .............................................. C25B 1/00
[52] U.S. Cl. ...................................................... 204/96
[58] Field of Search ......................................... 204/96

[56] References Cited

U.S. PATENT DOCUMENTS

| | | | |
|---|---|---|---|
| 3,535,217 | 10/1970 | Amano et al. | 204/96 |
| 4,048,027 | 9/1977 | Senderoff | 204/61 |
| 4,405,419 | 9/1983 | Misawa et al. | 204/96 |

FOREIGN PATENT DOCUMENTS

| | | | |
|---|---|---|---|
| 104499 | 9/1976 | Japan | 204/96 |
| 58-64756 | 4/1983 | Japan | 204/96 |
| 6813621 | 3/1970 | Netherlands | 204/96 |

*Primary Examiner*—R. L. Andrews
*Attorney, Agent, or Firm*—Cornelius F. O'Brien

[57] ABSTRACT

A bath for the production of electrolytic manganese dioxide comprising an aqueous solution of a manganous salt and a suspension agent which is an insoluble multivalent element or an insoluble compound of a multivalent metal other than manganese, and having a pH of between about 1 and about 2, may be electrolyzed at an anodic current density of 10.8 to 21.5 mA/cm$^2$ (10 to 20 A/ft$^2$) to produce battery grade EMD.

25 Claims, No Drawings

SUSPENSION BATH AND PROCESS FOR PRODUCTION OF ELECTROLYTIC MANGANESE DIOXIDE

FIELD OF THE INVENTION

This invention relates to a bath for the production of electrolytic manganese dioxide, which bath comprises at least one suspension agent selected from the group consisting of insoluble multivalent elements and of insoluble compounds of multivalent metals other than manganese. In another aspect, this invention relates to a process for producing electrolytic manganese dioxide employing such bath.

BACKGROUND OF THE INVENTION

The use of manganese dioxide as an active cathode material in dry cells is well known. Among the forms of manganese dioxide which have been found to exhibit desirable electrochemical properties in both aqueous and nonaqueous cells is electrolytic manganese dioxide ("EMD"). As is noted in U.S. Pat. No. 4,048,027, in the prior art the production of electrolytic manganese dioxide has typically entailed the feeding of a preheated $MnSO_4$—$H_2SO_4$ bath into an electrolytic cell which is operated with direct current under the following general conditions:

a. electrolytic bath concentration—$MnSO_4$: 0.5 to 1.2 mole/liter; $H_2SO_4$: 0.5 to 1.0 mole/liter;
b. electrolytic bath temperature, 80° C. to 100° C.; and
c. an anodic current density of 7 to 12 mA/cm$^2$ (i.e., about 7.6 to 13.1 A/ft$^2$).

The anode employed in such electrolytic process is generally composed of titanium, lead alloy or carbon. The cathode is typically composed of carbon, lead or platinum. During electrolysis manganese dioxide is deposited at the anode. The electrolytic manganese dioxide is removed from the anode and after conventional post-treatment, it is ready for use as an active cathode material in dry cells.

In conventional prior art processes, the current density is the principal factor with respect to productivity. However, increasing the current density in excess of the range recited above in order to increase productivity leads to oxygen evolution at the anode with consequent lowering of EMD production efficiency. Such oxygen evolution may result in passivation and/or consumption of the anode. Further, the EMD produced by electrolysis at these higher current densities exhibits undesirable physical properties.

In order to overcome such limitation upon productivity, it has become known in the art that the current density of an EMD production bath may be increased without an adverse effect on voltage if a suspension of manganese oxide particles is employed in the bath. Thus, U.S. Pat. No. 4,405,419 discloses a process for producing manganese dioxide comprising the electrolysis of a slurry of particles of manganese oxides in an aqueous solution of manganese sulfate at current densities of up to 16 mA/cm$^2$ (i.e. about 14.9 A/ft$^2$). Similarly, Japanese Patent Disclosure No. 1976-104499 discloses a process for the production of EMD by the electrolysis of a solution of manganese sulfate containing sulfuric acid in the presence of a suspension of particles of manganese oxide other than divalent manganese employing anodic current densities of up to 20 mA/cm$^2$ (18.6 A/ft$^2$).

The manganous salts, derived from manganous ores, that are typically employed as starting materials in the EMD production process generally contain some amount of undesirable impurities, particularly potassium. During the electrolysis of these salts potassium is incorporated into the resultant EMD. As is well known in the art, the presence of potassium in electrolytic manganese dioxide is undesirable, having adverse effects on the utilization of such manganese dioxide in alkaline cells. It would therefore be beneficial to provide a process for the manufacture of EMD, which process would reduce the amount of potassium incorporated into the product EMD from the manganese ore starting material.

It is therefore an object of this invention to provide a bath for the production of EMD which bath will allow an increased production rate of EMD.

It is a further object of the invention to provide a bath for the production of EMD which bath when electrolyzed will produce EMD which performs desirably when employed in acidic, alkaline and nonaqueous battery systems.

It is another object of this invention to provide a bath for the production of EMD, which bath when electrolyzed will produce EMD having a reduced potassium content.

It is yet another object of this invention to provide a process for the production of EMD, which process will permit rapid production of EMD.

The above and additional objects will become clear from the following description and Examples.

DESCRIPTION OF THE INVENTION

This invention relates to a bath for the production of electrolytic manganese dioxide, said bath comprising (a) between about 0.5 and about 1.3 moles/liter of an aqueous solution of at least one manganese salt selected from the group consisting of manganous sulfate, manganous chloride and manganous nitrate; (b) a sufficient quantity of at least one acid selected from the group consisting of sulfuric acid, hydrochloric acid and nitric acid so that the pH of said bath is between about 1 and about 2; and (c) at least one suspension agent which is selected from the group consisting of insoluble multivalent elements and of insoluble compounds of multivalent metals other than manganese.

In another aspect, the invention relates to a process for the production of electrolytic manganese dioxide, which process comprises:

(1) preparing a bath comprising (a) between about 0.5 and about 1.3 moles/liter of an aqueous solution of at least one manganese salt selected from the group consisting of manganous sulfate, manganous chloride and manganous nitrate, (b) a sufficient quantity of at least one acid selected from the group consisting of sulfuric acid, nitric acid and hydrochloric acid such that the pH of the bath is between about 1 and about 2, and (c) at least one suspension agent selected from the group consisting of insoluble multivalent elements and of insoluble compounds of multivalent metals other than manganese;
(2) heating said bath to between about 90° C. and about 100° C.; and
(3) electrolyzing the heated bath in an electrolytic cell having at least one anode and at least one cathode, preferably at an anode current density of between about 10 and about 20 amperes per square foot (i.e., between about 10.8 and about 21.5 mA/cm$^2$).

As is employed herein the term "insoluble", when applied to the suspension agent of this invention, refers to materials having a solubility of no greater than about one gram per liter in the heated suspension bath.

The EMD-production bath of this invention is comprised of an aqueous solution of a manganese salt, an acid, and a suspension agent.

The manganese salts which may be employed in such bath are manganous sulfate, manganous nitrate and manganous chloride. Moreover, mixed baths using two or more of these salts may also be utilized. The manganous salts are present in a concentration of between about 0.5 mole/liter and about 1.3 moles/liter of bath, with concentrations of between about 0.7 mole/liter and about 1.0 mole/liter being preferred.

The acids which may be employed in the bath of this invention include sulfuric acid, nitric acid, hydrochloric acid and mixtures thereof. The acid is added in a sufficient quantity such that the pH of the solution prior to the application of current is between about 1 and about 2. Typically, this will involve an acid concentration of between about 0.2 and about 0.6 mole of acid per liter of bath.

It is preferred that the acid and manganese salt employed in any particular bath possess identical anions, i.e., that nitric acid be employed with manganous nitrate, sulfuric acid with manganous sulfate, and hydrochloric acid with manganous chloride. Similarly, when mixed manganous salts are employed in is preferred that corresponding mixed acids are used, e.g., hydrochloric acid and nitric acid when a mixture of manganous chloride and manganous nitrate is employed.

The suspension agent of the bath of this invention is at least one member selected from the group consisting of insoluble multivalent elements and of insoluble compounds of multivalent metals other than manganese. Illustrative of the insoluble compounds of multivalent metals other than manganese which may be employed are niobium boride, titanium boride, zirconium carbide, ferric oxide ($Fe_2O_3$), ferrosoferric oxide ($Fe_3O_4$), iron disulfide ($FeS_2$), tin dioxide, tin difluoride, lead dioxide, lead difluoride, cobalt oxide, nickel oxide, hafnium carbide, boron carbide, molybdenum disulfide, cerium dioxide, silicon dioxide, bismuth trioxide, titanium dioxide, tungsten trioxide, chromium dioxide, molecular sieves including those of the zeolitic type, and the like. Illustrative of the insoluble multivalent elements which may be employed are carbon and sulfur. The preferred suspension agents are ferric oxide, tin dioxide, iron disulfide, lead dioxide and zeolitic molecular sieves.

It is within the scope of this invention to employ combinations of two or more suspension agents such as tin difluoride with tin dioxide, lead dioxide with ferric oxide, tin dioxide with silicon dioxide, and the like. The preferred combination of suspension agents is tin difluoride with tin dioxide.

The suspension agent may be present in concentrations of between about 0.05 gram per liter and about 5.0 grams per liter of bath, with concentrations between about 0.1 gram per liter and about 1.0 gram per liter being preferred.

The particles of suspension agent of the EMD production bath of this invention preferably possess an average diameter of between about 0.3 micrometers and about 150 micrometers and most preferably possess an average diameter of between about 0.3 micrometers and about 75 micrometers.

The suspension bath of this invention is typically prepared as follows: an aqueous solution of an appropriate manganese salt having a concentration of between about 0.5 and about 1.3 moles per liter is prepared; a sufficient amount of an appropriate acid is added such that the pH of the solution is between about 1 and about 2; and between about 0.05 and about 5.0 grams per liter of a suspension agent is then added to the acidic solution.

The suspension bath is then typically introduced into an electrolytic cell having at least one cathode composed of carbon, lead or platinum and at least one anode composed of lead alloy, carbon, titanium or titanium-manganese alloy. Titanium, carbon and titanium-manganese alloy anodes are preferred.

The bath is heated to between about 90° C. and about 100° C., preferably to between about 93° C. and about 98° C. (Optionally, the bath could be heated prior to introduction into the electrolytic cell or prepared, heated and electrolyzed in the same vessel.) The bath is preferably electrolyzed at an anode current density of between about 10.8 mA/cm$^2$ and about 21.5 mA/cm$^2$ (i.e., between about 10 and about 20 amperes per square foot), most preferably of between about 12.9 mA/cm$^2$ and about 19.4 mA/cm$^2$ (i.e., between about 12 and about 18 amperes per square foot). Electrolysis at anode current densities below about 10.8 mA/cm$^2$ is not preferred as the major advantage of the suspension bath (i.e., the ability to employ higher current densities with a corresponding higher EMD production rate) is not realized at such lower current densities. Electrolysis at anode current densities above about 21.5 mA/cm$^3$ is not preferred as passivation and/or consumption of the anode may occur at these higher current densities. The application of such current will cause electrolytic manganese dioxide to be deposited at the anode of the electrolytic cell.

The EMD so produced is removed from the anode and then typically is crushed, washed with water, and dried (usually at about 110° C.) prior to being employed in galvanic cells. Optionally, the EMD may be treated with a base, such as sodium hydroxide or ammonia, prior to being washed with water and dried.

The EMD produced using the suspension bath of this invention may be manufactured at high rates and high efficiencies due to the higher current to which the electrolytic bath may be subjected. As shown in Example 1 below, such EMD will typically contain trace amounts of the suspension material, which may be desirable for certain uses of such EMD.

The EMD produced using the suspension bath of this invention exhibits desirable discharge characteristics in galvanic cells comprising acid electrolytes, alkaline electrolytes and, if appropriately heat treated, in nonaqueous electrolytes. In electrolytes contaminated with potassium, several of the suspension agents of this invention have been unexpectedly found to reduce the amount of potassium which may become incorporated into the EMD.

EXAMPLES

The following Examples are intended to further illustrate the invention and are not intended to limit the scope of the invention in any respect.

EXAMPLE 1

Several solutions containing 0.92 molar $MnSO_4$ and 0.28 molar $H_2SO_4$ along with the suspension agents listed in Table I were electrolyzed at 95° C. with an anode of Ti-Mn alloy (containing 8 weight percent manganese) and a platinum mesh cathode. The area of the anode was 12.8 cm$^2$ and the initial current 207 mA (i.e., 16.1 mA/cm$^2$ or 15.0 A/ft$^2$). As the anode increased in area with deposition of MnO$_2$, the current was raised to maintain the desired current density. Electrolysis was continued for 40 hours and the EMD produced subjected to elemental analysis. The results of such analysis are summarized in Table I.

TABLE I

Suspension Agent Produced EMD

| Suspension Agent | Quantity (g/liter) | % MnO$_2$[1] | Peroxidation[2] | % Multivalent Component Detected | Percent Current Efficiency[3] |
|---|---|---|---|---|---|
| niobium boride | 0.2 | 90.42 | 1.95 | not analyzed | 101 |
| titanium boride | 0.2 | 89.33 | 1.95 | not analyzed | 97 |
| zirconium carbide | 0.2 | 92.20 | 1.94 | not analyzed | 102 |
| Fe$_2$O$_3$ | 0.2 | 90.53 | 1.96 | 0.57 Fe | 115.4 |
| Fe$_2$O$_3$ | 0.5 | 89.28 | 1.95 | 1.57 Fe | 70 |
| Fe$_3$O$_4$ | 0.2 | 89.66 | 1.95 | 0.43 Fe | 88 |
| FeS$_2$ | 0.2 | 88.90 | 1.94 | 0.07 Fe Trace S | 98 |
| FeS$_2$ | 0.5 | 89.28 | 1.95 | 0.32 Fe 0.41 S | 94 |
| SnO$_2$ | 0.2 | 89.72 | 1.94 | 0.46 Sn | 114 |
| SnF$_2$ | 0.2 | 86.40 | 1.93 | 0.09 Sn | 109 |
| SnF$_2$ + SnO$_2$ | 0.1 + 0.1 | 89.44 | 1.96 | 0.31 Sn | 96 |
| PbO$_2$ | 0.2 | 91.24 | 1.96 | 0.66 Pb | 111 |
| PbO$_2$ + Fe$_2$O$_3$ | 0.1 + 0.1 | 90.31 | 1.95 | 0.49 Fe 0.70 Pb | 106.3 |
| PbF$_2$ | 0.2 | 92.38 | 1.95 | 0.25 Pb | 99 |
| PbCl$_2$ + PbO$_2$ | 1.5 + 0.2 | 91.51 | 1.96 | 0.39 Pb | 89 |
| CoO | 0.2 | 85.97 | 1.93 | 0.28 Co | 104 |
| MoS$_2$ | 0.2 | 90.10 | 1.95 | 0.69 Mo | 102 |
| CeO$_2$ | 0.2 | 90.20 | 1.95 | 0.76 Ce | 107 |
| SiO$_2$ | 0.2 | 91.07 | 1.97 | 0.30 Si | 107 |
| Bi$_2$O$_3$ | 0.2 | 90.10 | 1.95 | 0.07 Bi | 107 |
| TiO$_2$ | 0.2 | 89.33 | 1.96 | not analyzed | 111.4 |
| WO$_3$ | 0.2 | 91.24 | 1.95 | not analyzed | 99.4 |
| CrO$_2$ | 0.2 | 89.82 | 1.94 | 0.39 Cr | 90 |
| S | 0.2 | 87.70 | 1.92 | 0.75 S | 103.5 |
| C[4] | 0.2 | 90.86 | 1.95 | Not Analyzed | 113 |
| Molecular Sieve 4A[5] | 0.2 | 91.73 | 1.95 | 0.13 S; Al not detected | 107 |
| Molecular Sieve 13X[6] | 0.2 | 91.94 | 1.96 | 0.05 S; Al not detected | 101 |

[1]The remaining portion of the product comprises manganese compounds of lower valency, water, and possibly small amounts of the suspension material.
[2]The number listed is x in the formula MnO$_x$.
[3]Current efficiency based on the oxidation reaction of Mn$^{2+}$ to Mn$^{4+}$, assuming product entirely MnO$_2$.
[4]Graphite available; from Lonza Corporation.
[5]A sodium-type zeolitic molecular sieve having an average pore size of about 4 Angstroms; available from Union Carbide Corporation.
[6]A sodium-type zeolitic molecular sieve having an average pore size of about 10 Angstroms; available from Union Carbide Corporation.

The above data indicate that EMD having a high peroxidation value may be produced utilizing a high current density employing the suspension agents of this invention. As is known in the art, efficiencies may exceed 100% because of the production of lower valence species and the presence of combined water (see K. Matsuki, T. Endo and H. Kumada, *SEM Studies of Electrolyte Manganese Dioxide*, Electrochemical Acts, Vol. 29, No. 7, pp. 983-993 (1984)).

EXAMPLE 2

Several solutions comprising 0.92M MnSO$_4$, 0.28M H$_2$SO$_4$, 1.5 grams per liter of potassium in the form of K$_2$SO$_4$, and 0.2 gram per liter of the suspension agent listed in Table II below were electrolyzed for 40 hours at 95° C. at an anodic current density of 16.1 mA/cm$^2$ (except as noted) and the resultant MnO$_2$ analyzed. The results of such analysis are summarized in Table II.

TABLE II

Removal of Potassium by Suspension Agent

| Suspension Agent | % MnO$_2$ | Peroxidation | Weight Percent Potassium in EMD |
|---|---|---|---|
| None* | 89.12 | 1.95 | 1.05 |
| MnO$_2$ | 89.01 | 1.94 | 1.20 |
| Fe$_2$O$_3$ | 89.44 | 1.95 | 0.19 |
| SnO$_2$ | 86.84 | 1.94 | 0.40 |
| FeS$_2$ | 90.00 | 1.95 | 0.19 |
| SnF$_2$ + SnO$_2$** | 89.23 | 1.96 | 0.41 |

*anode current density was 8.1 mA/cm$^2$
**0.1 gram per liter of each component

The above results indicate that, unlike manganese dioxide, several of the suspension agents of the bath of this invention will reduce the amount of potassium incorporated into the EMD produced, thereby producing EMD which will be more effective in alkaline cells.

EXAMPLE 3

One tenth of a gram of several EMD samples produced using a variety of suspension agents (after being ground in a micromill, passed through a 200 mesh screen, washed several times with distilled water, and dried at 110° C. overnight) were force discharged according to the method described by A. Kozawa and R. A. Powers in Electrochem. Tech., volume 5, 535 (1967) at 1 mA against a saturated calomel electrode in a 25 weight percent ZnCl$_2$ electrolyte. The voltage was monitored until a reading of 0.0 volt against the reference electrode was obtained. The suspension bath which produced the particular EMD tested contained 0.2 gram per liter of the listed suspension agent and had been electrolyzed at a current density of 16.1 mA/cm$^2$ (15 amperes per square foot) at the anode. The results of such testing are summarized in Table III below.

TABLE III

Forced Discharge of EMD in Acid Electrolyte

| EMD Suspension Agent | Voltage (in volts) after hours discharge | | | | | | Hours to 0.0 Volt Recorded |
| | 0 hrs | 5 hrs | 10 hrs | 15 hrs | 20 hrs | 25 hrs. | |
|---|---|---|---|---|---|---|---|
| MnO$_2$ | .626 | .369 | .317 | .207 | .031 | — | 20 |
| FeS$_2$ | .550 | .327 | .294 | .265 | .220 | — | 24 |
| NiO | .614 | .359 | .313 | .281 | .237 | — | 24.5 |
| boron carbide | .593 | .360 | .324 | .300 | .269 | .180 | 26.5 |
| hafnium carbide | .565 | .331 | .297 | .268 | .226 | — | 24.5 |

The above results indicate that the electrolysis of several of the suspension baths of this invention will produce an EMD which demonstrates improved performance in acidic electrolyte relative to EMD produced using manganese dioxide as a suspension agent.

EXAMPLE 4

One tenth of a gram of several EMD samples produced using a variety of suspension agents (after being ground in a micromill, passed through a 200 mesh screen, washed several times with distilled water, and dried at 110° C. overnight) were force discharged against an Hg/HgO electrode in a 9N KOH electrolyte and the voltage monitored until a reading of $-0.2$ volts against such reference electrolyte was obtained, in accordance with the procedure described by A. Kozawa and R. A. Powers in Electrochem. Tech., Vol. 5, 535 (1967). The suspension bath which produced the particular EMD tested contained 0.2 gram per liter of the listed suspension agent and was electrolyzed at an anode current density of 16.1 mA/cm$^2$ (15 A/ft$^2$). The results of such testing are summarized in Table IV below.

TABLE IV

Forced Discharge of EMD in Alkaline Electrolyte

| EMD Suspension Agent | Voltage (in volts) after hours discharge | | | | Hours to $-0.2$ Volt Recorded |
|---|---|---|---|---|---|
| | 0 hrs | 5 hrs | 10 hrs | 15 hrs | 20 hrs | |
| MnO$_2$ | .109 | $-.014$ | $-.063$ | $-.152$ | $-.208$ | 17 |
| FeS$_2$ | .109 | $-.028$ | $-.084$ | $-.146$ | $-.259$ | 18 |
| NiO | .126 | $-.009$ | $-.066$ | $-.129$ | $-.242$ | 18 |
| boron carbide | .108 | $-.023$ | $-.068$ | $-.117$ | $-.207$ | 20 |
| hafnium carbide | .085 | $-.046$ | $-.098$ | $-.163$ | $-.278$ | 16.5 |
| titanium carbide | .096 | $-.027$ | $-.076$ | $-.130$ | $-.224$ | 19 |

The above results indicate that the EMDs produced by the process of this invention exhibit desirable performance in alkaline electrolytes.

Although preferred embodiments of this invention have been described in detail, it is contemplated that modifications thereof may be made and some features may be employed without others, all within the spirit and scope of this invention.

What is claimed is:

1. A bath for the production of electrolytic manganese dioxide comprising (a) between about 0.5 and about 1.3 moles/liter of an aqueous solution of at least one manganese salt selected from the group consisting of manganous sulfate, manganous chloride and manganous nitrate; (b) a sufficient quantity of at least one acid selected from the group consisting of sulfuric acid, hydrochloric acid and nitric acid so that the pH of said bath is between about 1 and about 2; and (c) at least one suspension agent which is selected from the group consisting of insoluble multivalent elements and of insoluble compounds of multivalent metals other than manganese.

2. The bath of claim 1 wherein the manganese salt and the acid possess identical anions.

3. The bath of claim 1 wherein the suspension agent is present in a concentration of between about 0.05 gram per liter and about 5.0 grams per liter.

4. The bath of claim 3 wherein the suspension agent is present in a concentration of between about 0.1 gram per liter and about 1.0 gram per liter.

5. The bath of claim 1 wherein the suspension agent has an average particle diameter size of between about 0.3 and about 150 micrometers.

6. The bath of claim 5 wherein the suspension agent has an average particle diameter size between about 0.3 and about 75 micrometers.

7. The bath of claim 1 wherein the suspension agent is at least one member of the group consisting of niobium boride, titanium boride, zirconium carbide, hafnium carbide, boron carbide, ferric oxide, ferrosoferric oxide, iron disulfide, tin difluoride, cobalt oxide, lead dioxide, lead difluoride, molybdenum disulfide, nickel oxide, tin dioxide, cerium dioxide, silicon dioxide, bismuth trioxide, titanium dioxide, tungsten trioxide and chromium dioxide.

8. The bath of claim 7 wherein the suspension agent is at least one member of the group consisting of ferric oxide, tin dioxide, iron disulfide and lead dioxide.

9. A process for the production of electrolytic manganese dioxide, which process comprises:
   (1) preparing a bath comprising (a) between about 0.5 and about 1.3 moles/liter of an aqueous solution of at least one manganese salt selected from the group consisting of manganous sulfate, manganous chloride and manganous nitrate, (b) a sufficient quantity of at least one acid selected from the group consisting of sulfuric acid, nitric acid and hydrochloric acid such that the pH of the bath is between about 1 and about 2, and (c) at least one suspension agent selected from the group consisting of insoluble multivalent elements, and of insoluble compounds of multivalent metals other than manganese;
   (2) heating said bath to between about 90° C. and about 100° C.; and
   (3) electrolyzing the heated bath in an electrolytic cell having at least one anode and at least one cathode.

10. The process of claim 9 wherein the manganese salt and the acid possess identical anions.

11. The process of claim 9 wherein the suspension agent is present in a concentration of between about 0.05 gram per liter and about 5.0 grams per liter.

12. The process of claim 11 wherein the suspension agent is present in a concentration of between about 0.1 gram per liter and about 1.0 gram per liter.

13. The process of claim 9 wherein the suspension agent has an average particle diameter size of between about 0.3 and about 150 micrometers.

14. The process of claim 13 wherein the suspension agent has an average particle diameter size of between about 0.3 and about 75 micrometers.

15. The process of claim 9 wherein the suspension agent is at least one member of the group consisting of niobium boride, titanium boride, zirconium carbide, hafnium carbide, boron carbide, ferric oxide, ferrosoferric oxide, iron disulfide, tin difluoride, cobalt oxide, lead dioxide, lead difluoride, molybdenum disulfide, nickel oxide, tin dioxide, cerium dioxide, silicon dioxide, dibismuth trioxide, titanium dioxide, tungsten trioxide and chromium dioxide.

16. The process of claim 15 wherein the suspension agent is at least one member of the group consisting of ferric oxide, tin dioxide, iron disulfide and lead dioxide.

17. The process of claim 9 wherein the electrolysis of step (3) is conducted at an anode current density of between about 10.8 and about 21.5 mA/cm$^2$.

18. The process of claim 17 wherein the electrolysis of step (3) is conducted at an anode current density of between about 12.9 and about 19.4 mA/cm$^2$.

19. The process of claim 9 wherein the bath is heated to between about 93° C. and about 98° C. in step (2).

20. The bath of claim 1 wherein the suspension agent is a molecular sieve.

21. The bath of claim 1 wherein the suspension agent is at least one member of the group consisting of carbon and sulfur.

22. The bath of claim 1 wherein the suspension agent is a zeolitic molecular sieve.

23. The process of claim 9 wherein the suspension agent is a molecular sieve.

24. The process of claim 9 wherein the suspension agent is at least one member of the group consisting of carbon and sulfur.

25. The process of claim 19 wherein the suspension agent is a zeolitic molecular sieve.

* * * * *